US012644866B2

(12) United States Patent
Balasubramanian et al.

(10) Patent No.: US 12,644,866 B2
(45) Date of Patent: Jun. 2, 2026

(54) SYSTEM AND A METHOD FOR DETECTING AND CHARACTERIZING A DEFECT IN AN OBJECT USING GUIDED WAVE INSPECTION

(71) Applicant: INDIAN INSTITUTE OF TECHNOLOGY MADRAS (IIT MADRAS), Tamil Nadu (IN)

(72) Inventors: Krishnan Balasubramanian, Tamil Nadu (IN); Nived Suresh, Kannur (IN)

(73) Assignee: Indian Institute Of Technology Madras (IIT Madras), Chennai (IN)

( * ) Notice: Subject to any disclaimer, the term of this patent is extended or adjusted under 35 U.S.C. 154(b) by 287 days.

(21) Appl. No.: 18/569,181

(22) PCT Filed: May 13, 2022

(86) PCT No.: PCT/IN2022/050464
§ 371 (c)(1),
(2) Date: Dec. 11, 2023

(87) PCT Pub. No.: WO2022/259262
PCT Pub. Date: Dec. 15, 2022

(65) Prior Publication Data
US 2024/0264126 A1 Aug. 8, 2024

(30) Foreign Application Priority Data
Jun. 11, 2021 (IN) .............................. 202141025996

(51) Int. Cl.
*G01N 29/46* (2006.01)
*G01N 29/04* (2006.01)

(52) U.S. Cl.
CPC ........... *G01N 29/46* (2013.01); *G01N 29/043* (2013.01); *G01N 2291/023* (2013.01); *G01N 2291/048* (2013.01); *G01N 2291/106* (2013.01)

(58) Field of Classification Search
CPC ................. G01N 29/46; G01N 29/043; G01N 2291/023; G01N 2291/048; G01N 2291/106
See application file for complete search history.

(56) References Cited

U.S. PATENT DOCUMENTS

| | | | | |
|---|---|---|---|---|
| 4,305,294 A | * | 12/1981 | Vasile | .................... G01B 17/02 |
| | | | | 73/579 |
| 4,600,852 A | * | 7/1986 | Garber | ................. H03H 9/0274 |
| | | | | 310/313 C |

(Continued)

FOREIGN PATENT DOCUMENTS

| | | | | | |
|---|---|---|---|---|---|
| CN | | 113804134 A | * | 12/2021 | ............. G01B 17/00 |

*Primary Examiner* — Chico A Foxx
(74) *Attorney, Agent, or Firm* — DLA Piper LLP (US)

(57) ABSTRACT

A method of detecting and characterizing a defect in an object is described. The method comprises implementing comb-like pattern transducers upon the object to be tested, where each comb-like pattern transducer comprises array of source elements is periodically placed, selectively activating at least a group of source elements of the first comb-like pattern transducer to generate one or more guided waves. The method further comprises transmitting the one or more guided waves from the first end of the object, receiving at least a portion of the one or more guided waves at the second comb-like pattern transducer, and receiving a remaining portion of the one or more guided waves at the first comb-like pattern transducer, analyzing the one or more received guided waves to determine a cut-off frequency, calculating a (Continued)

remnant thickness value based on the cut-off frequency, and detecting and characterizing the defect in the object based on the remnant thickness value.

12 Claims, 6 Drawing Sheets

(56)                      References Cited

U.S. PATENT DOCUMENTS

| | | | |
|---|---|---|---|
| 2002/0021878 A1* | 2/2002 | Allan | G02F 1/011 |
| | | | 385/144 |
| 2009/0078049 A1* | 3/2009 | Sinha | G01N 29/28 |
| | | | 73/623 |
| 2013/0140955 A1* | 6/2013 | Chaggares | H10N 30/063 |
| | | | 310/334 |
| 2020/0056917 A1* | 2/2020 | Firouzi | G01F 1/667 |
| 2021/0108916 A1* | 4/2021 | Vine | G01B 17/02 |
| 2022/0214313 A1* | 7/2022 | Balasubramanian | |
| | | | G01N 29/348 |
| 2023/0288374 A1* | 9/2023 | Belanger | G01N 29/48 |

* cited by examiner

100

500

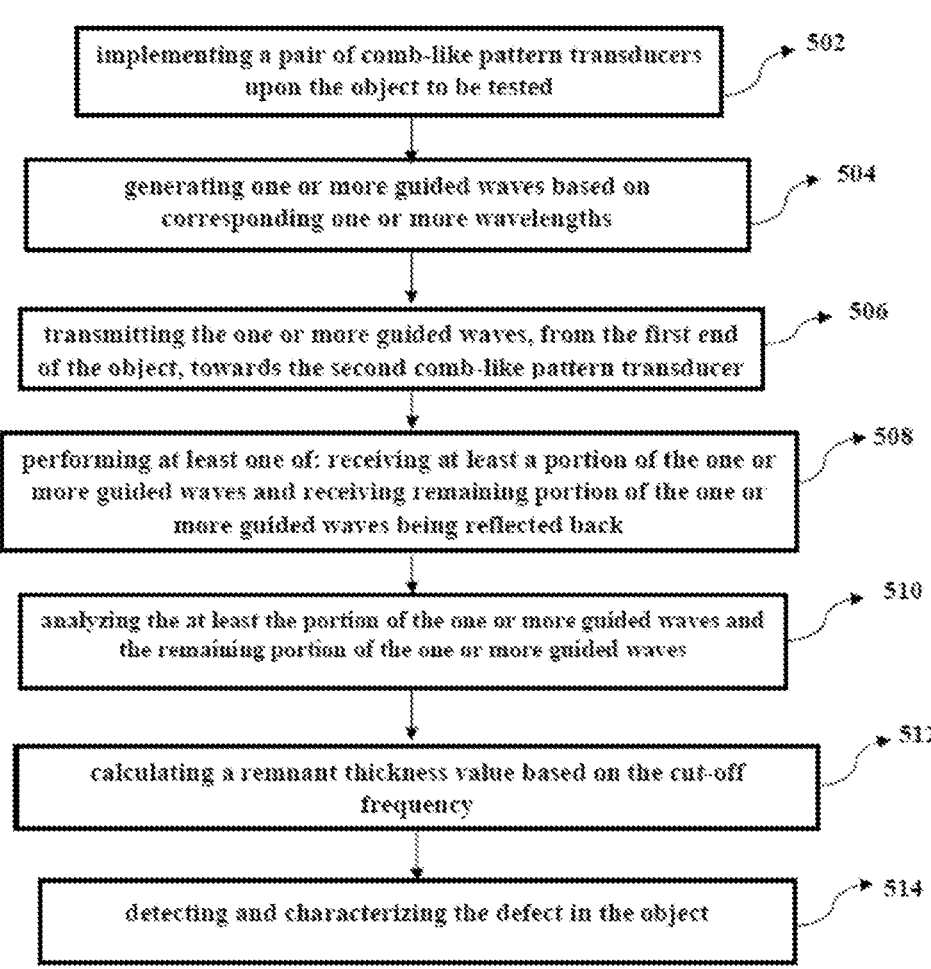

implementing a pair of comb-like pattern transducers upon the object to be tested — 502 generating one or more guided waves based on corresponding one or more wavelengths — 504 transmitting the one or more guided waves, from the first end of the object, towards the second comb-like pattern transducer — 506 performing at least one of: receiving at least a portion of the one or more guided waves and receiving remaining portion of the one or more guided waves being reflected back — 508 analyzing the at least the portion of the one or more guided waves and the remaining portion of the one or more guided waves — 510 calculating a remnant thickness value based on the cut-off frequency — 512 detecting and characterizing the defect in the object — 514

FIG. 5

SYSTEM AND A METHOD FOR DETECTING AND CHARACTERIZING A DEFECT IN AN OBJECT USING GUIDED WAVE INSPECTION

CROSS-REFERENCE TO RELATED APPLICATIONS

The present application is a 35 U.S.C. § 371 National Stage Patent Application of PCT Application No. PCT/IN2022/050464, entitled "A SYSTEM AND A METHOD FOR DETECTING AND CHARACTERIZING A DEFECT IN AN OBJECT USING GUIDED WAVE INSPECTION," filed on May 13, 2022, which claims the benefit of Indian Patent Application number 202141025996, entitled "A SYSTEM AND A METHOD FOR DETECTING AND CHARACTERIZING A DEFECT IN AN OBJECT USING GUIDED WAVE INSPECTION," filed Jun. 11, 2021. The contents of each of these applications are hereby incorporated by reference in their entireties.

TECHNICAL FIELD

The present disclosure relates to non-destructive evaluation and structural health and integrity monitoring of a material or an object. More particularly, but not exclusively, the present disclosure relates to a technique of generating guided waves at different wavelength for detecting and characterizing a defect in an object.

BACKGROUND

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Guided wave inspection is extensively used in non-destructive evaluation (NDE) application. Most of the methods utilize guided wave use in a single-mode for inspection. The existence of many modes at a single frequency makes the guided wave inspection complicated. However, mode conversions and dispersive effects increase the difficulty in the analysis. Hence, different approaches have been used to excite a single-mode alone.

One of the popular methods is the usage of comb transduction. Comb transduction constrains the wavelength of excitation, which enables the selective excitation of a single wave mode. In addition to the selective excitation of a single mode, comb transduction helps to excite a wave mode at different wavelengths and frequencies. If the wave mode excited is a higher-order mode, the different wavelengths of excitation produce different cut-off thickness for that mode. This approach can effectively measure the remnant thickness of structures using the cut-off property of guided wave modes. However, such approach is still dependent on arrangement of source elements of mechanical movement systems such as transducers.

Presently, the mechanical movement systems are used to change the wavelength of excitation. In these systems, each source element is placed inside a tray. The distance between adjacent trays are varied to change the wavelength of excitation. However, these types of expensive, sophisticated mechanical movement system are hard to manufacture.

Moreover, since these systems are generally placed in a complex areas, the accessibility of these systems becomes another challenge.

Thus, there is need for the techniques that overcome the above-mentioned drawbacks/fulfils the above needs and provide an electronically controlled wavelength changing system that implements on the existing phased array equipment.

SUMMARY

The present disclosure overcomes one or more shortcomings of the prior art and provides additional advantages discussed throughout the present disclosure. Additional features and advantages are realized through the techniques of the present disclosure. Other embodiments and aspects of the disclosure are described in detail herein and are considered a part of the claimed disclosure.

In one non-limiting embodiment of the present disclosure, a method of detecting and characterizing a defect in an object is disclosed. The method comprises step of implementing a pair of comb-like pattern transducers upon the object to be tested in such a manner that a first comb-like pattern transducer is placed at a first end and a second comb-like pattern transducer is placed at a second end of the object. Each comb-like pattern transducer comprises an array of source elements being periodically placed. The method further comprises step of generating one or more guided waves based on corresponding one or more wavelengths, each guided wave being generated by selectively activating at least a group of source elements, amongst the array of source elements, of the first comb-like pattern transducer. Further, the method comprises step of transmitting the one or more guided waves, from the first end of the object, towards the second comb-like pattern transducer. The method further comprises step of, based on the transmitting, performing at least one of receiving at least a portion of the one or more guided waves at the second comb-like pattern transducer, and receiving remaining portion of the one or more guided waves being reflected wave at the first comb-like pattern transducer. Further, the method comprises step of analyzing the at least the portion of the one or more guided waves and the remaining portion of the one or more guided waves using two-dimensional Fast Fourier Transform (2D-FFT) technique for performing at least one of a frequency-wavenumber domain analysis and a frequency-wavelength domain analysis in order to determine a cut-off frequency. Further, method comprises step of calculating a remnant thickness value based on the cut-off frequency. The method further comprises a step of detecting and characterizing the defect in the object based on the remnant thickness value.

In yet another non-limiting embodiment of the present disclosure, the step of generating the one or more guided waves comprises individually controlling each source element of the array of source elements for generating the one or more guided waves, each source element of the array of source elements comprising at least one of piezoelectric material, Lorentz force EMAT elements, and magnetostrictive strip elements.

In yet another non-limiting embodiment of the present disclosure, the step of generating the one or more guided waves comprises selecting a group of source elements from the array of source elements, applying excitation weights to each of the source element of the group of source elements, and generating the one or more guided waves based on the excitation weights and the respective wavelength.

In yet another non-limiting embodiment of the present disclosure, the one or more guided waves are generated corresponding one or more guided wave modes, wherein the one or more guided wave modes include one of Zero Group Velocity (ZGV) mode and Negative Group Velocity (NGV) wave mode.

In yet another non-limiting embodiment of the present disclosure, the step of generating the one or more guided waves comprises generating one of single wavelength, multiple wavelengths or broad band wavelengths based on aperiodic or non-uniform selection of the source elements and the excitation weights.

In yet another non-limiting embodiment of the present disclosure, the array of source elements are placed at an equal distance, and wherein the distance between one source element and adjacent source element of the array of source elements is indicated as pitch.

In yet another non-limiting embodiment of the present disclosure a system for detecting and characterizing a defect in an object is disclosed. Said system discloses having a pair of comb-like pattern transducers placed upon the object to be tested in such a manner that a first comb-like pattern transducer is placed at a first end and a second comb-like pattern transducer is placed at a second end of the object, each comb-like pattern transducer comprises an array of source elements being periodically placed. The system further comprises at least one control circuitry, coupled with the pair of comb-like pattern transducers, configured to selectively activate of at least a group of source elements, amongst the array of source elements, of the first comb-like pattern transducer to generate one or more guided waves based on corresponding one or more wavelengths. The first comb-like pattern transducer is configured to transmit the one or more guided waves, from the first end of the object, towards the second comb-like pattern transducer. The pair of comb-like pattern transducers is configured to, based on the transmission of the one or more guided waves, perform at least one of receive at least a portion of the one or more guided waves by the second comb-like pattern transducer, and receive remaining portion of the one or more guided waves being reflected back by the first comb-like pattern transducer. The system further comprises a processing unit configured to analyze the at least the portion of the one or more guided waves and the remaining portion of the one or more guided waves using two-dimensional Fast Fourier Transform (2D-FFT) technique for performing at least one of a frequency-wavenumber domain analysis and a frequency-wavelength domain analysis in order to determine a cut-off frequency, calculate a remnant thickness value based on the cut-off frequency, and detect and characterize the defect in the object based on the remnant thickness value.

In yet another non-limiting embodiment of the present disclosure, to generate the one or more guided waves the at least one control circuitry is configured to individually control each source element of the array of source elements for generating the one or more guided waves, each source element of the array of source elements comprising at least one piezoelectric material, Lorentz force EMAT elements, and Magnetostrictive strip elements.

In yet another non-limiting embodiment of the present disclosure, to generate the one or more guided waves the at least one control circuitry is configured to select a group of source elements from the array of source elements, apply excitation weights to each of the source element of the group of source elements, and generate the one or more guided waves based on the excitation weights and the respective wavelength.

In yet another non-limiting embodiment of the present disclosure, to generate the one or more guided waves the at least one control circuitry is configured to generate one of single wavelength, multiple wavelengths or broad band wavelengths based on aperiodic or non-uniform selection of source elements and the excitation weights.

The foregoing summary is illustrative only and is not intended to be in any way limiting. In addition to the illustrative aspects, embodiments, and features described above, further aspects, embodiments, and features will become apparent by reference to the drawings and the following detailed description.

OBJECTS OF THE INVENTION

The primary object of the present disclosure is to provide an electronically controlled wavelength changing system to be implemented on the existing phased array equipment.

Another object of the present disclosure is to overcome the burden of mechanical movement while transmitting and receiving guided waves.

Further object of the present disclosure is to detect and characterize a defect in an object.

BRIEF DESCRIPTION OF THE ACCOMPANYING DRAWINGS

The features, nature, and advantages of the present disclosure will become more apparent from the detailed description set forth below when taken in conjunction with the drawings in which like reference characters identify correspondingly throughout. Some embodiments of system and/or methods in accordance with embodiments of the present subject matter are now described, by way of example only, and with reference to the accompanying figures, in which:

FIG. 1 shows an exemplary arrangement of source elements in a comb-like pattern transducer, in accordance with an embodiment of the present disclosure;

FIG. 2(a) and FIG. 2(b) illustrate state of source elements and excitation profile of source elements for different wavelengths, in accordance with an embodiment of the present disclosure;

FIG. 3(a) and FIG. 3(b) illustrate state of source elements with weightage and excitation profile of source elements with weightage for different wavelengths, in accordance with an embodiment of the present disclosure;

FIG. 5 shows a flowchart disclosing method of detecting and characterizing a defect in an object, in accordance with an embodiment of the present disclosure;

Figure 1:
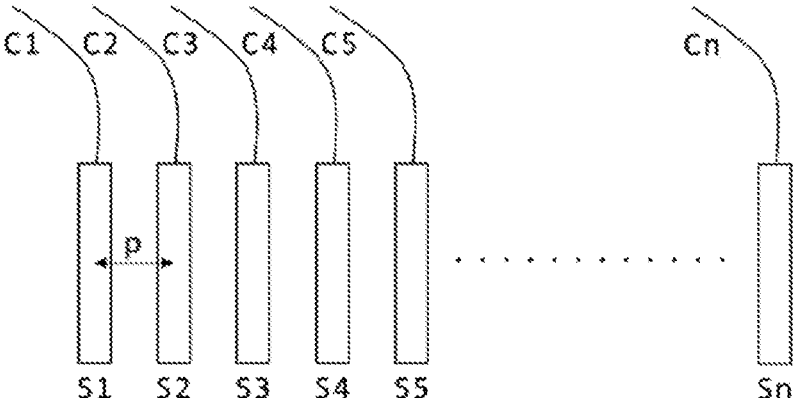

It should be appreciated by those skilled in the art that any block diagrams herein represent conceptual views of illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration". Any embodiment or implementation of the present subject-matter described herein as "exemplary" is not necessarily to be construed as preferred or advantageous over other embodiments.

While the disclosure is susceptible to various modifications and alternative forms, specific embodiments thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", "include(s)", or any other variations thereof, are intended to cover a non-exclusive inclusion, such that a setup, system or method that comprises a list of components or steps does not include only those components or steps but may include other components or steps not expressly listed or inherent to such setup or system or method. In other words, one or more elements in a system or apparatus proceeded by "comprises . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure will be described herein below with reference to the accompanying drawings. In the following description, well known functions or constructions are not described in detail since they would obscure the description with unnecessary detail.

The present disclosure relates to detecting and characterizing defects in an object. Industries like oil refineries or coal mining follows extra precautions since they deal with handling of hazardous materials like petrol, gas, etc. Various components are used for transporting the materials like crude oil from one location to another which requires supervision. The present disclosure discloses a technique, in which, comb-like transducers having source elements are placed upon the objects like pipes through which these hazardous materials are transported. The objective of placing the comb-like transducers is to keep a regular check on health of such objects. According to an embodiment of present disclosure, the source elements of the comb-like transducers are periodically placed in an equidistant manner and are operated in such a manner that they are capable of generating guided waves at different wavelengths. The unique arrangement of the source elements enables efficient and safe supervision while detecting any defects in the objects (pipes). The detailed explanation of the arrangement and working of the disclosed comb-like transducer is provided in the subsequent paragraphs of the specification.

FIG. 1 shows an exemplary arrangement of source elements in a comb-like pattern transducer, in accordance with an embodiment of the present disclosure.

In an embodiment of the present disclosure, the arrangement may comprise an array system that requires static source elements arranged periodically. The array of source elements may be present within the comb-like transducer.

The array system may comprise a plurality of identical source elements S1, S2, S3, S4, S5, . . . Sn. The number of source elements may be varied based on a wavelength of excitation and application. Each of the source element comprises a respective connections wire C1, C2, C3, C4, C5, etc.

Each of the source element is placed at an equal distance and the distance between one source element to the adjacent source element is known as the pitch 'p'. The direction of vibration of the individual array depends on a wave mode being excited. The direction of vibration may be in-plane or out-of-plane vibrations to generate Lamb wave modes, or the vibrations may be horizontal shear vibrations to generate Shear horizontal (SH) wave modes.

In an embodiment of the present disclosure, the array of source elements may be arranged periodically in a comb-like pattern transducer. The array of source elements of comb-like pattern transducer are capable of generating an ultrasonic guided wave corresponding to a guided wave mode by controlling each source element individually.

In an embodiment of the present disclosure, the transmission and the reception of ultrasonic guided waves may be achieved using the same array system such as a pulse-echo system, where only one array system is used for transmission and reception. In one non-limiting embodiment, the array system may be configured to receive the reflections of the ultrasonic waves transmitted by the array system.

In another embodiment of the present disclosure, the transmission and the reception of ultrasonic guided waves may be achieved using the different array system such as a pitch-catch/through transmission system where one array system is used for transmission and another array system of similar type is used for reception.

Figure 2A:
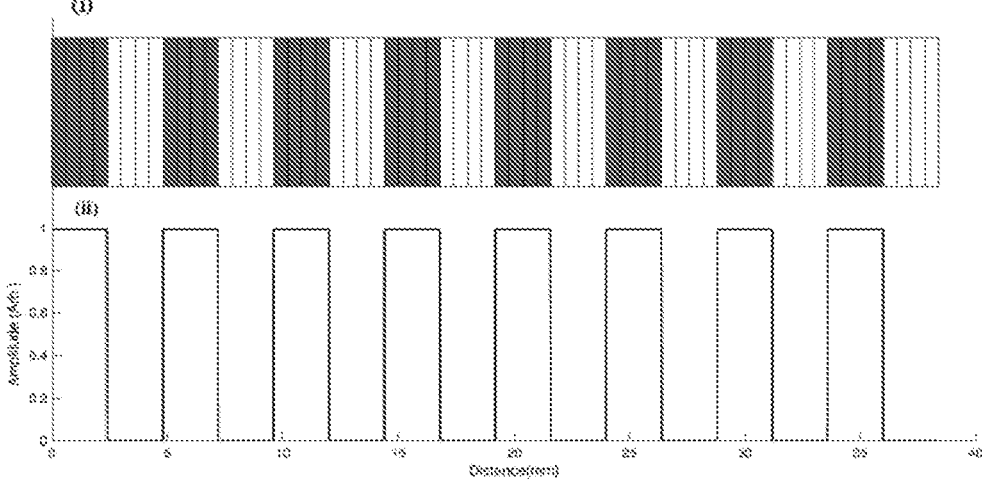
Figure 2B:
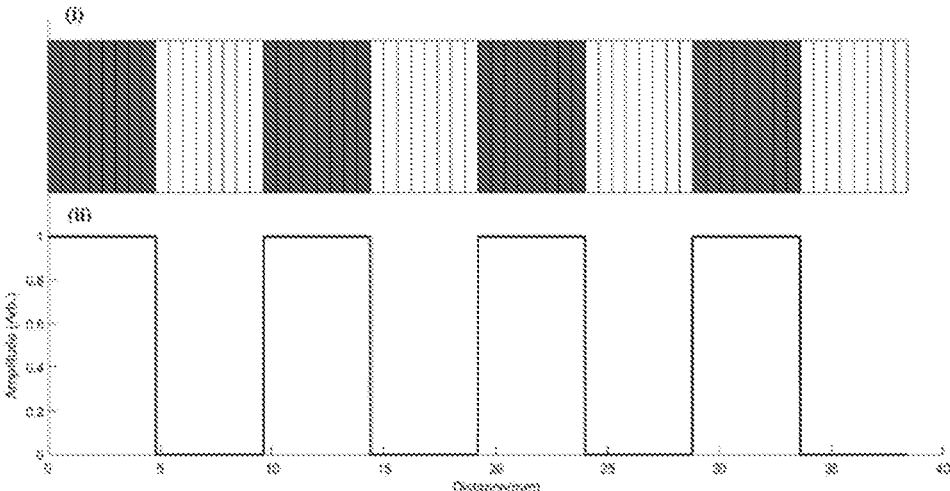

FIG. 2(a)-2(b) illustrate state of source elements and excitation profile of source elements for different wavelengths, in accordance with an embodiment of the present disclosure.

In an embodiment of the present disclosure, a group of source elements amongst the array of source elements of the comb-like pattern transducer may be selected to generate an ultrasonic guided wave. In other words, the selected group of source elements are turned ON and the remaining of the array of source elements are in OFF state. The number of elements in the state of ON/OFF may be chosen based on the excitation wavelength. The maximum transmission efficiency of a wavelength may occur when ON and OFF region has equal length.

In an embodiment of the present disclosure, the comb-like transducer may comprise 64 source elements with a pitch of 0.6 mm. As shown in FIG. 2(a)(i), 4 continuous source elements are in ON state and 4 continuous source elements are in OFF state for defining the 4.8 mm wavelength. The dark shades indicates the ON state, and the white shades indicates the OFF state. The wavelength may be varied by changing the number of ON and OFF state of the source elements. This facilitates electronically controlled wavelength changing system that implements on the phased array equipment and eliminates the requirement of mechanically controlled wavelength changing system.

FIG. 2(a)(ii) illustrates excitation profile obtained for 4.8 mm excitation wavelength. The above mentioned technique of selectively turning ON the group of source elements from the array of source elements for generating the ultrasonic wave at a particular wavelength may be implemented on most of the available phased array systems.

FIG. 2(b)(i) illustrates a comb like transducer with 64 source elements having a pitch of 0.6 mm defining a wavelength of 9.6 mm using the ON/OFF technique, according to an embodiment of the present disclosure. For generating an excitation wavelength of 9.6 mm, 8 continuous source elements are in ON state and 8 continuous source elements are in OFF state. Thus, varying the number of source elements in the ON/OFF state configuration from 4 to 8, the excitation wavelength of the comb like transducer may be varied from 4.8 mm to 9.6 mm. Like FIG. 2(a)(ii), the FIG. 2(b)(ii) illustrates excitation profile obtained for 9.6 mm excitation wavelength.

Figure 3A:
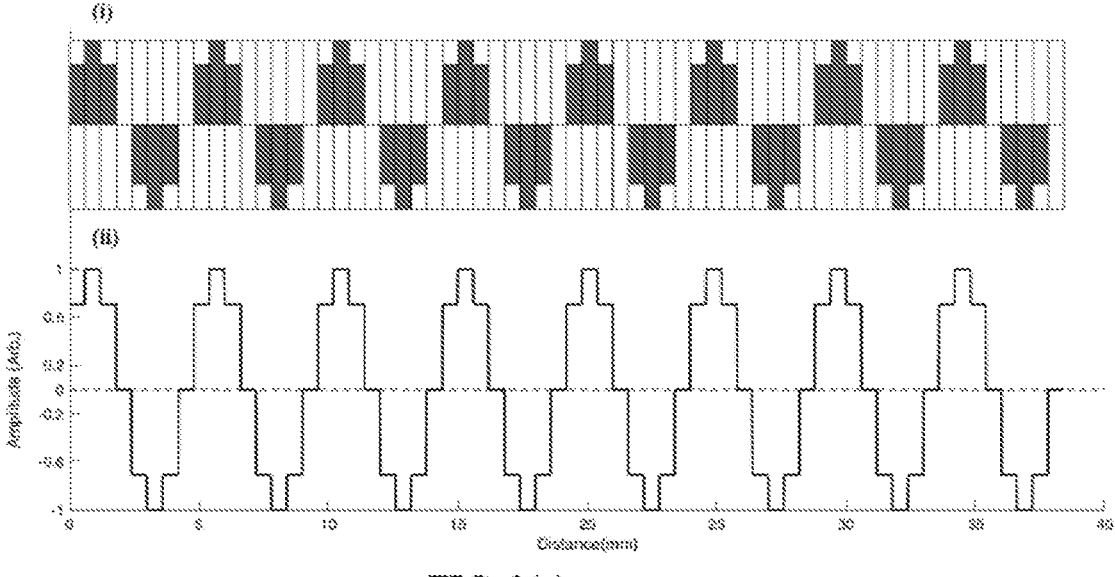
Figure 3B:
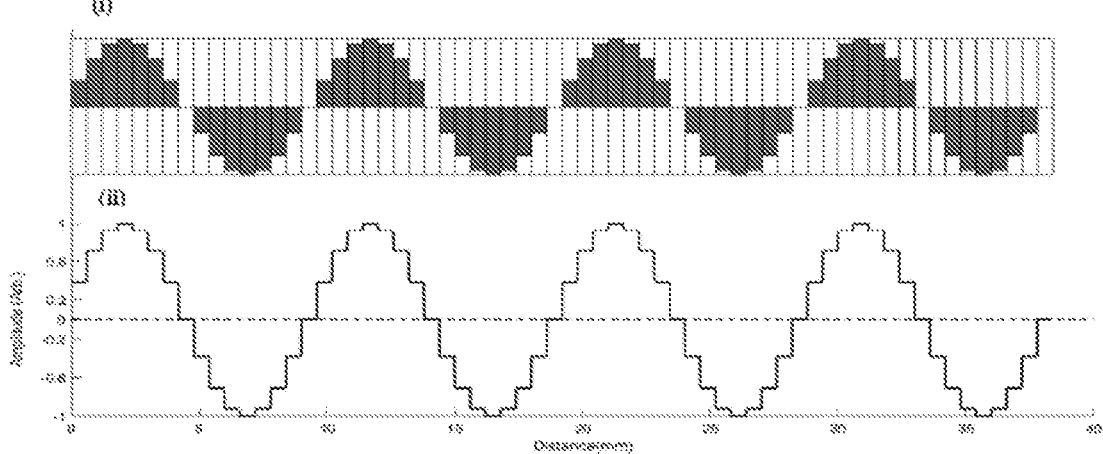

FIG. 3(a)-3(b) illustrate state of source elements with weightage and excitation profile of source elements with weightage for different wavelengths, in accordance with an embodiment of the present disclosure.

In an embodiment of the present disclosure, the guided waves may be generated by selecting a group of source elements to be turned ON and applying weighing function to each of source element in ON state. This defines the excitation profile in a stepwise sine/cosine pattern. The amplitude of the weighing function varies from −1 to 1. In this manner, the wavelength excited is more coherent towards the central wavelength compared to the ON/OFF method. As the pitch value of the element array decreases, the shape of the sine/cosine gets refined. In one non-limiting embodiment, the weighing function may be applied without selecting a group of source elements to be turned ON. The source elements to be turned OFF are assigned a weight w=0.

FIG. 3(a) (i) shows an array system comprising 64 elements with a pitch of 0.6 mm for generating an excitation wavelength of 4.8 mm. 8 different weight elements may be used to define one cycle of a sine wave. Unlike the ON/OFF technique, excitation in the weightage method has directional dependency. The height of the dark shade from center represents the weightage. FIG. 3(a) (ii) shows the excitation profile of the 4.8 mm wavelength defined using the weightage method.

FIG. 3(b) (i) shows an array system comprising 64 elements with a pitch of 0.6 mm for generating an excitation wavelength of 9.6 mm. 8 different weight elements may be used to define one cycle of a sine wave. FIG. 3(b) (ii) shows the excitation profile of the 9.6 mm wavelength defined using the weightage method. In one non-limiting embodiment of the present disclosure, as the number of elements defining a wavelength increases, the shape of the excitation profile tends towards a sine/cosine profile.

In an embodiment of the present disclosure, the generated one or more guide waves as shown in FIGS. 2(a), 2(b), 3(a), and 3(b) may be transmitted through an object or material to be tested using the array system of the comb-like transducer. The same array system configuration used for transmission may be used for the reception also. Each source element of the array system at the receiving end receives the transmitted waves separately. There may be 'n' number of time responses collected from each source element. The distance between two data collection points is the pitch 'p.' The element wise reception helps in overcoming the burden of mechanical movement while transmitting and receiving guided waves.

In an embodiment of the present disclosure, a comb-like transducer is placed at a first end of an object to be tested and another comb-like transducer is placed at a second end of the object. The comb-like transducer present at the first end may transmit as well as receive the guided waves. The comb-like transducer present at the second end may only receive the guided waves transmitted from the first end.

Once the guided wave is transmitted from first transducer towards second transducer placed on the object to be tested, it may so happen that only a portion of guided waves may reach to the second transducer while remaining portion may reflect back to the first transducer. This indicates that object might have some defect, and therefore, entire guided wave is not able to reach to other end i.e., second transducer. However, in case there is no defect, the entire guided wave may be received by the second transducer. Thus, the at least the at least the portion of guided wave that is received by the second transducer and the remaining portion of the guided waive that are reflected back and further received by the first transducer (collectively referred as "received guided waves") may be then analysed by analyzing the wave modes in a frequency-wavenumber (f-k) diagram using two-dimensional Fast Fourier Transform (2D-FFT) technique in order to determine the cut-off frequency. In one non-limiting embodiment of the present disclosure, the received guided waves may be analysed for determining the cut-off frequency using any other technique known to a person skilled in the art. The detailed explanation of cut-off frequency and how it is related to remnant thickness value is explained below using FIG. 4.

Figure 4:
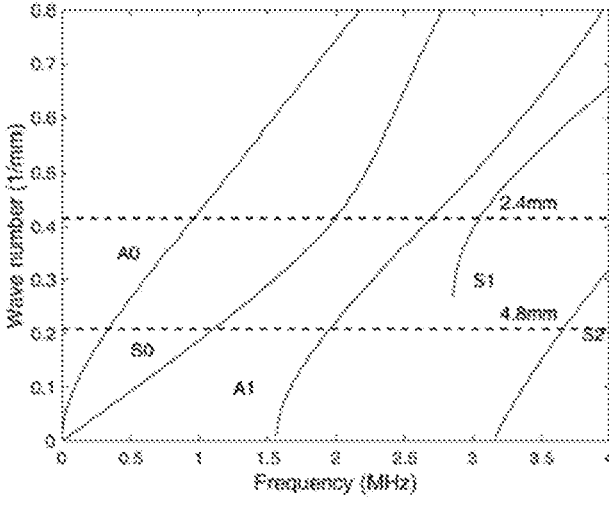
FIG. 4 illustrates frequency-wavenumber diagram for determination of cut-off frequency of guided waves, in accordance with an embodiment of the present disclosure.

FIG. 4 illustrates frequency-wavenumber diagram for determination of cut-off frequency of guided waves, in accordance with an embodiment of the present disclosure.

FIG. 4 shows a guided wave dispersion curve for different wave modes in an aluminium plate (of thickness 1 mm) in a wavenumber-frequency diagram. Two examples of excitation wavelengths 2.4 mm and 4.8 mm are marked in dashed. The wavelength or wavenumber of the guided waves may be changed using the ON/OFF technique and weightage techniques discussed above. So, wave mode may be excited at the point where the dashed line meets the wave mode line. This along with the frequency of excitation enables us to generate a wave mode at a particular wavenumber.

Each of the higher order wave modes such as A1, S1, SH1, A2, S2, SH2, etc has a cut-off frequency for a particular thickness of the object or plate to be tested. Only wave modes having frequencies higher than the cut-off frequency passes through it. As the wave propagates, if the thickness reduces below the cut-off thickness, the wave mode reflects. Only wave modes having frequency and wavenumber higher than the cut-off value passes through the reduced thickness region. Hence, excitation of wave modes at different wavenumbers is capable of inspecting remnant thickness values.

Relation between excitation wavelength and A1 mode cut-off thickness is tabulated below for two example wavelengths of excitations in an Aluminium plate.

TABLE 1

| Excitation Wavelength (mm) | Excitation wavenumber (1/mm) | A1 mode frequency (MHz) | Cut-off thickness (mm) |
|---|---|---|---|
| 2.4 | 0.42 | 2.70 | 0.55 |
| . . . | . . . | . . . | . . . |
| . . . | . . . | . . . | . . . |
| 4.8 | 0.21 | 1.95 | 0.76 |

Table 1 shows the relationship between excitation wavelength and cut-off thickness for an Aluminium plate of thickness 1 mm. If the excitation wavelength of A1 mode is 2.4 mm, then this wave mode will not travel if the thickness reduces below 0.55 mm. If the excitation wavelength of A1 mode is 4.8 mm, then this wave mode will not travel if the thickness reduces below 0.76 mm. By sweeping the different excitation wavelengths, the exact remnant thickness of the plate can be evaluated and defect in the plate can be detected. This way, the defect in the object may be the detected and characterized based on the remnant thickness value.

FIG. 5 shows a flowchart disclosing method of detecting and characterizing a defect in an object, in accordance with an embodiment of the present disclosure.

At block 502, the method 500 discloses implementing a pair of comb-like pattern transducers upon the object to be tested in such a manner that a first comb-like pattern transducer of the pair is placed at a first end of the object and a second comb-like pattern transducer is placed at a second end of the object. Each comb-like pattern transducer comprises an array of source elements is periodically placed or arranged.

Each of the source element are placed at an equal distance and the distance between one source element to the adjacent source element is known as the pitch 'p'. The source elements of the array of source elements comprises at least one of piezoelectric material, Lorentz force EMAT elements, and magnetostrictive strip elements. However, the source elements are not limited to above mentioned examples and a person in the skilled may use any material having properties similar to above examples.

In an embodiment of the present disclosure, the array of source elements of comb-like pattern transducer are capable of generating an ultrasonic guided wave corresponding to one or more guided wave modes. The phrase "ultrasonic guided wave" and "guided waves" have been interchangeably used throughout the specification.

At block 504, the method 500 discloses generating one or more guided waves based on corresponding one or more wavelengths. The one or more guided waves are generated by selectively activating at least a group of source elements, amongst the array of source elements, of the first comb-like pattern transducer. The selected group of source elements may be turned ON and remaining of the source elements shall remain in OFF state.

The number of elements in the state of ON/OFF may be chosen based on the excitation wavelength. The maximum transmission efficiency of a wavelength may occur when ON and OFF region has equal length. The technique of activating the group of source elements amongst the array of source elements is discussed in detail using FIG. 2(a) and FIG. 2(b) in above embodiments.

In an embodiment of the present disclosure, for generating the one or more guided waves, the method comprises individually controlling each source element of the array of source elements for generating the one or more guided wave having different wavelength. This facilitates electronically controlled wavelength changing system and eliminates the requirement of mechanically controlled wavelength changing system.

In an embodiment of the present disclosure, the individually control on each source elements and flexibility to change between different wavelength facilitates generation of Zero Group Velocity (ZGV) and Negative Group Velocity (NGV) wave modes.

In an embodiment of the present disclosure, the generation the one or more guided waves comprises generating one of single wavelength, multiple wavelengths or broad band wavelengths based on aperiodic or non-uniform selection of the source elements and the excitation weights. The single wavelength is generated by a periodic selection of source elements. The multiple wavelengths are generated by more than one periodic selection of source elements. The broad-band wavelengths are generated by aperiodic or non-uniform selection of source elements.

In an embodiment of the present disclosure, the generation the one or more guided waves comprises selecting a group of source elements from the array of source elements based on the wavelength of excitation, applying excitation weights to each of the source element of the group of source elements, and generating the one or more guided waves based on the excitation weights and the respective excitation wavelength.

In one non-limited embodiment of the present disclosure, the generation the one or more guided waves comprises applying excitation weights to each of the source element and generating the one or more guided waves based on the excitation weights. The application of weightage function or weights to a group of source elements or to the complete array of source elements is discussed in detail using FIG. 3(a) and FIG. 3(b) in above embodiments.

At block 506, the method 500 discloses transmitting the one or more guided waves, from the first end of the object, towards the second comb-like pattern transducer. The one or more guided waves are transmitted using the first comb-like pattern transducer. The second comb-like pattern transducer is situated at the second end of the object to be tested.

At block 508, the method 500 discloses based on the transmitting, receiving at least a portion of the one or more guided waves at the second comb-like pattern transducer, and receiving remaining portion of the one or more guided waves being reflected back at the first comb-like pattern transducer. If the object contains a defect only a portion of the one or more guided waves reaches the second comb-like pattern transducer and remaining portion of the one or more guided waves are reflected back toward the first comb-like pattern transducer.

Each source element of the array system of the first and the second comb-like transducer receives the transmitted waves separately. The element wise reception provides a technical advantage of overcoming the burden of mechanical movement while transmitting and receiving guided waves.

At block 510, the method 500 discloses analyzing the at least the portion of the one or more guided waves and the remaining portion of the one or more guided waves using two-dimensional Fast Fourier Transform (2D-FFT) technique for performing at least one of a frequency-wavenumber domain analysis and a frequency-wavelength domain analysis in order to determine a cut-off frequency. However, the analysis of the one or more received guided waves is not limited to above mentioned technique and a person skilled in the art may apply any other technique known to a person skilled in the art to determine the cut off frequency.

At block 512, the method 500 discloses calculating a remnant thickness value of the object being tested based on the cut-off frequency. The remnant thickness value may vary based on wave mode family, order of the wave mode, shape of the inspecting material. The remnant thickness value may be calculated as discussed in above embodiments. However, the calculation of remnant thickness is not limited to above embodiments and a person skilled in the art may any other technique known to a person skilled in the art to calculate the remnant thickness.

At block 514, the method 500 discloses detecting and characterizing the defect in the object based on the remnant thickness value. The remnant thickness value calculated for the received guided waves are characterized to detect a type and location of the defect in the object. The detected defect may a corrosion, erosion, or any other type of defect for which the object is tested. The defect detection and characterization from the remnant thickness value may be performed by any technique known to a person skilled in the art Thus, the method 500 facilitates an electronically controlled wavelength changing method that can be implemented on the existing phased array equipment and overcome the burden of mechanical movement while transmitting and receiving guided waves. The method 500 further facilitates accurate detection of defect in an object.

In an embodiment of the present disclosure, the steps of method 500 may be performed in an order different from the order described above.

Figure 6:
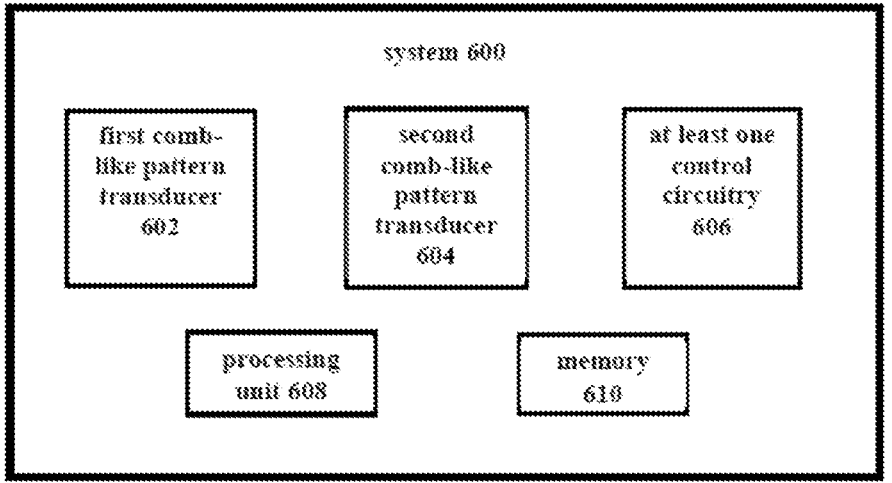
FIG. 6 shows a block diagram of a system for of detecting and characterizing a defect in an object, in accordance with an embodiment of the present disclosure.

FIG. 6 shows a block diagram of a system 600 for of detecting and characterizing a defect in an object, in accordance with an embodiment of the present disclosure.

The system 600 may comprise a pair of comb-like pattern transducers that includes a first comb-like pattern transducers 602, and second comb-like pattern transducers 604. The system 600 further comprises at least one control circuitry 606, a processing unit 608, and a memory 610. The first comb-like pattern transducers 602, the second comb-like pattern transducers 604, at least one control circuitry 606, a processing unit 608, and memory 610 are coupled with each other. In one non-limiting embodiment, the processing unit 608 may be present locally in the system 600 or may be present in the vicinity of the system 600. In another non-limiting embodiment, the processing unit 608 may be remotely present at a server.

The pair of comb-like pattern transducers placed upon the object to be tested in such a manner that a first comb-like pattern transducer 602 is placed at a first end and a second comb-like pattern transducer 604 is placed at a second end of the object. Each comb-like pattern transducer comprises an array of source elements is periodically placed or arranged.

Each of the source element are placed at an equal distance and the distance between one source element to the adjacent source element is known as the pitch 'p'. The source elements of the array of source elements comprises at least one of piezoelectric material, Lorentz force EMAT elements, and magnetostrictive strip elements. However, the source elements are not limited to above mentioned examples and a person in the skilled may use any material having properties similar to above examples.

In an embodiment of the present disclosure, the array of source elements of each comb-like pattern transducers 602, 604 are capable of generating an ultrasonic guided wave corresponding to one or more guided wave modes. The phrase "ultrasonic guided wave" and "guided waves" have been interchangeably used throughout the specification.

The at least one control circuitry 606 may be configured to selectively activate of at least a group of source elements, amongst the array of source elements, of the first comb-like pattern transducer to generate one or more guided waves based on corresponding one or more wavelengths. The selected group of source elements may be turned ON and remaining of the source elements shall remain in OFF state.

The number of elements in the state of ON/OFF may be chosen based on the excitation wavelength. The maximum transmission efficiency of a wavelength may occur when ON and OFF region has equal length. The technique of activating the group of source elements amongst the array of source elements is discussed in detail using FIG. 2(*a*) and FIG. 2(*b*) in above embodiments.

In an embodiment of the present disclosure, to generate the one or more guided waves, the at least one control circuitry 606 may be configured to individually control each source element of the array of source elements for generating the one or more guided wave having different wavelength. This facilitates electronically controlled wavelength changing system and eliminates the requirement of mechanically controlled wavelength changing system.

In an embodiment of the present disclosure, the individually control on each source elements and flexibility to change between different wavelength facilitates generation of Zero Group Velocity (ZGV) and Negative Group Velocity (NGV) wave modes.

In an embodiment of the present disclosure, to generate the one or more guided waves the at least one control circuitry 606 is configured to generate one of single wavelength, multiple wavelengths or broad band wavelengths based on aperiodic or non-uniform selection of the source elements and the excitation weights. The single wavelength is generated by a periodic selection of source elements. The multiple wavelengths are generated by more than one periodic selection of source elements. The broadband wavelengths are generated by aperiodic or non-uniform selection of source elements.

In an embodiment of the present disclosure, to generate the one or more guided waves the at least one control circuitry 606 is configured to select a group of source elements from the array of source elements based on the wavelength of excitation, apply excitation weights to each of the source element of the group of source elements, and generate the one or more guided waves based on the excitation weights and the respective excitation wavelength.

In one non-limited embodiment of the present disclosure, to generate the one or more guided waves the at least one control circuitry 606 is configured to apply excitation weights to each of the source element and generate the one or more guided waves based on the excitation weights. The application of weightage function or weights to a group of source elements or to the complete array of source elements is discussed in detail using FIG. 3(*a*) and FIG. 3(*b*) in above embodiments.

The first comb-like pattern transducer 602 may be configured to transmit the one or more guided waves, from the first end of the object, towards the second comb-like pattern transducer 604. The second comb-like pattern transducer 604 is situated at the second end of the object to be tested.

The pair of comb-like pattern transducers may be configured to, based on the transmission of the one or more guided waves, perform at least one of receive at least a portion of the one or more guided waves by the second comb-like pattern transducer, and receive remaining portion of the one or more guided waves being reflected back by the first comb-like pattern transducer.

If the object contains a defect only a portion of the one or more guided waves reaches the second comb-like pattern transducer 604 and remaining portion of the one or more guided waves are reflected back toward the first comb-like pattern transducer 602.

Each source element of the array system of the first and the second comb-like transducer 602, 604 receives the transmitted waves separately. The element wise reception enables the system 600 to overcome the burden of mechanical movement while transmitting and receiving guided waves.

The processing unit 608 may be configured to analyse the one or more received guided waves using two-dimensional Fast Fourier Transform (2D-FFT) technique for performing at least one of a frequency-wavenumber domain analysis and a frequency-wavelength domain analysis in order to determine a cut-off frequency. However, the analysis of the one or more received guided waves is not limited to above mentioned technique and a person skilled in the art may apply any other technique known to a person skilled in the art to determine the cut off frequency.

The processing unit 608 may be configured to calculate a remnant thickness value of the object being tested based on the cut-off frequency. The remnant thickness value may vary based on wave mode family, order of the wave mode, shape of the inspecting material. The remnant thickness value may be calculated as discussed in above embodiments. However, the calculation of remnant thickness is not limited to above embodiments and a person skilled in the art may any other technique known to a person skilled in the art to calculate the remnant thickness.

The processing unit 608 may be configured to detect and characterize the defect in the object based on the remnant thickness value. The remnant thickness value calculated for the received guided waves are characterized to detect a type and location of the defect in the object. The detected defect may a corrosion, erosion, or any other type of defect for which the object is tested. The defect detection and characterization from the remnant thickness value may be performed by any technique known to a person skilled in the art.

Thus, the system 600 facilitates an electronically controlled wavelength changing system that can be implemented on the existing phased array equipment and overcome the burden of mechanical movement while transmitting and receiving guided waves. The system 600 further facilitates accurate detection of defect in an object.

The processing unit 608 may include, but not restricted to, a general-purpose processors, a Field Programmable Gate Array (FPGA), an Application Specific Integrated Circuit (ASIC), a Digital Signal Processor (DSP), microprocessors, microcomputers, micro-controllers, digital signal processors, central processing units, state machines, logic circuitries, and/or any devices that manipulate signals based on operational instructions. The system 600 may comprise interfaces including a variety of software and hardware interfaces, for example, a web interface, a graphical user interface, an input device-output device (I/O) interface, an access network interface and the like.

The memory 610 may be communicatively coupled to processing unit 608. The memory 610 may comprise various software modules/codes such as, but not limited to, Bluetooth and Wi-Fi drivers. The memory 610 may include a Random-Access Memory (RAM) unit and/or a non-volatile memory unit such as a Read Only Memory (ROM), optical disc drive, magnetic disc drive, flash memory, Electrically Erasable Read Only Memory (EEPROM), a memory space on a server or cloud and so forth. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed.

Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, non-volatile memory, hard drives, CD ROMs, DVDs, flash drives, disks, and any other known physical storage media.

Exemplary embodiments discussed above may provide certain advantages. Though not required to practice aspects of the disclosure, these advantages may include those provided by the following features.

In an embodiment, the present disclosure describes a method and a system for detecting and characterizing a defect in an object.

In an embodiment, the method may be implemented by provide an electronically controlled wavelength changing system that can be implemented on the existing phased array equipment.

In an embodiment, implemented method and system overcome the burden of mechanical movement while transmitting and receiving guided waves.

In an embodiment, the present method and system provide accurate detection of defect in an object.

The invention claimed is:

1. A method of detecting and characterizing a defect in an object, the method comprising:
   implementing a pair of comb-like pattern transducers upon the object to be tested in such a manner that a first comb-like pattern transducer is placed at a first end and a second comb-like pattern transducer is placed at a second end of the object, wherein each comb-like pattern transducer comprises an array of source elements is periodically placed;
   generating one or more guided waves based on corresponding one or more wavelengths, wherein each guided wave is generated by selectively activating at least a group of source elements, amongst the array of source elements, of the first comb-like pattern transducer;
   receiving a portion of the one or more guided waves at the second comb-like pattern transducer;
   receiving a remaining portion of the one or more guided waves being reflected back at the first comb-like pattern transducer;
   analyzing the portion of the one or more guided waves and the remaining portion of the one or more guided waves using a two-dimensional Fast Fourier Transform (2D-FFT) for performing at least one of a frequency-wavenumber domain analysis and a frequency-wavelength domain analysis in order to determine a cut-off frequency;
   calculating a remnant thickness value based on the cut-off frequency; and
   detecting and characterizing the defect in the object based on the remnant thickness value.

2. The method as claimed in claim 1, wherein generating the one or more guided waves comprises:
   individually controlling each source element of the array of source elements for generating the one or more guided waves, wherein each source element of the array of source elements comprises at least one of piezoelectric material, Lorentz force EMAT elements, and magnetostrictive strip elements.

3. The method as claimed in claim 1, wherein generating the one or more guided waves comprises:

selecting a group of source elements from the array of source elements;

applying excitation weights to each of the source element of the group of source elements; and generating the one or more guided waves based on the excitation weights and the respective wavelength.

4. The method as claimed in claim 1, wherein the one or more guided waves are generated corresponding one or more guided wave modes, wherein the one or more guided wave modes include one of Zero Group Velocity (ZGV) mode and Negative Group Velocity (NGV) wave mode.

5. The method as claimed in claim 1, wherein generating the one or more guided waves comprises generating one of single wavelength, multiple wavelengths or broad band wavelengths based on aperiodic or non-uniform selection of the source elements and the excitation weights.

6. The method as claimed in claim 1, wherein the array of source elements are placed at an equal distance, and wherein distance between one source element and adjacent source element of the array of source elements is indicated as pitch.

7. A system for detecting and characterizing a defect in an object, the system comprising:

a pair of comb-like pattern transducers placed upon the object to be tested in such a manner that a first comb-like pattern transducer is placed at a first end and a second comb-like pattern transducer is placed at a second end of the object, wherein each comb-like pattern transducer comprises an array of source elements is periodically placed;

at least one control circuitry, coupled with the pair of comb-like pattern transducers, is configured to:

selectively activate of at least a group of source elements, amongst the array of source elements, of the first comb-like pattern transducer to generate one or more guided waves based on corresponding one or more wavelengths;

wherein the first comb-like pattern transducer is configured to:

receive a portion of the one or more guided waves by the second comb-like pattern transducer, and receive a remaining portion of the one or more guided waves being reflected back by the first comb-like pattern transducer; and wherein the system further comprises a processing unit configured to:

analyze the portion of the one or more guided waves and the remaining portion of the one or more guided waves using a two-dimensional Fast Fourier Transform (2D-FFT) for performing at least one of a frequency-wavenumber domain analysis and a frequency-wavelength domain analysis in order to determine a cut-off frequency;

calculate a remnant thickness value based on the cut-off frequency; and detect and characterize the defect in the object based on the remnant thickness value.

8. The system as claimed in claim 7, wherein to generate the one or more guided waves the at least one control circuitry is configured to:

individually control each source element of the array of source elements for generating the one or more guided waves, wherein each source element of the array of source elements comprises at least one piezoelectric material, Lorentz force EMAT elements, and Magnetostrictive strip elements.

9. The system as claimed in claim 7, wherein to generate the one or more guided waves the at least one control circuitry is configured to:

select a group of source elements from the array of source elements;

apply excitation weights to each of the source element of the group of source elements; and generate the one or more guided waves based on the excitation weights and the respective wavelength.

10. The system as claimed in claim 7, wherein the one or more guided waves are generated corresponding one or more guided wave modes, wherein the one or more guided wave modes include one of Zero Group Velocity (ZGV) mode and Negative Group Velocity (NGV) wave mode.

11. The system as claimed in claim 7, wherein to generate the one or more guided waves the at least one control circuitry is configured to:

generate one of single wavelength, multiple wavelengths or broad band wavelengths based on aperiodic or non-uniform selection of source elements and the excitation weights.

12. The system as claimed in claim 7, wherein the array of source elements are placed at an equal distance, and wherein distance between one source element and adjacent source element of the array of source elements is indicated as pitch.

* * * * *